(12) United States Patent
Carenza

(10) Patent No.: US 9,202,204 B2
(45) Date of Patent: Dec. 1, 2015

(54) EMPLOYEE VACATION SCHEDULING SYSTEM WITH VARYING PAYOUT SCHEDULES

(71) Applicant: Amy Carenza, Dallas, TX (US)

(72) Inventor: Amy Carenza, Dallas, TX (US)

(*) Notice: Subject to any disclaimer, the term of this patent is extended or adjusted under 35 U.S.C. 154(b) by 0 days.

(21) Appl. No.: 14/628,234

(22) Filed: Feb. 21, 2015

(65) Prior Publication Data

US 2015/0170106 A1  Jun. 18, 2015

Related U.S. Application Data

(63) Continuation-in-part of application No. 13/856,312, filed on Apr. 3, 2013.

(51) Int. Cl.
  *G06Q 10/10* (2012.01)
(52) U.S. Cl.
  CPC .......... *G06Q 10/1095* (2013.01); *G06Q 10/105* (2013.01); *G06Q 10/1057* (2013.01); *G06Q 10/1093* (2013.01)
(58) Field of Classification Search
  CPC ...................................................... G06Q 10/10
  See application file for complete search history.

(56) References Cited

U.S. PATENT DOCUMENTS

| | | | | |
|---|---|---|---|---|
| 6,048,271 | A * | 4/2000 | Barcelou | 463/48 |
| 2004/0030601 | A1* | 2/2004 | Pond et al. | 705/16 |
| 2005/0209917 | A1* | 9/2005 | Anderson et al. | 705/14 |
| 2010/0023384 | A1* | 1/2010 | Pollard et al. | 705/11 |
| 2011/0034238 | A1* | 2/2011 | Phillips et al. | 463/25 |
| 2014/0279610 | A1* | 9/2014 | Hendrix | 705/317 |

* cited by examiner

*Primary Examiner* — Thomas Dixon
(74) *Attorney, Agent, or Firm* — Wick Phillips Gould & Martin LLP; Jerry C. Harris, Jr.

(57) ABSTRACT

Disclosed is an employee vacation scheduling system for enabling an employee to purchase vacation travel services on the basis of the availability of the paid leaves thereof. The vacation scheduling system comprises a database comprising a plurality of employees wherein, each employee is associated with the number of paid leaves the employee is entitled to. The scheduling system further comprises a store module for enabling an employee to purchase a vacation travel service that spans a predetermined number of vacation days, a date module for enabling the employee, in the process of purchasing the vacation travel service, to mark successive vacation dates for the utilization of the vacation travel service, and a payment module for enabling the employee to pay for the vacation travel service upon determining that the number of vacation days being variable based upon a selected day are lesser than or equivalent.

18 Claims, 5 Drawing Sheets

| STORE MODULE | |
|---|---|
| VACATION TRAVEL SERVICE #1 | BOOK |
| VACATION TRAVEL SERVICE #2 | BOOK |
| VACATION TRAVEL SERVICE #3 | BOOK |
| VACATION TRAVEL SERVICE #4 | BOOK |

FIG. 3

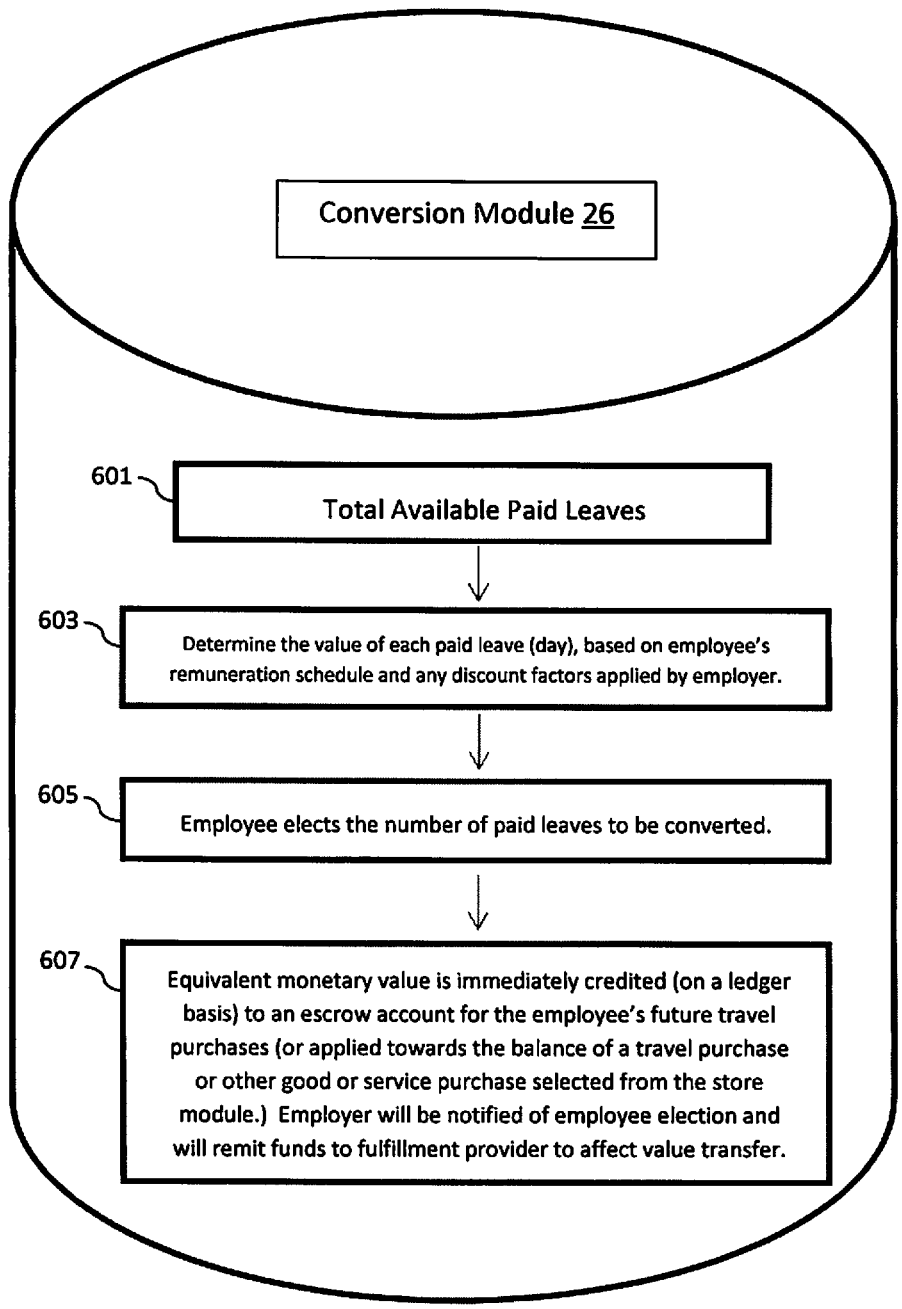

EMPLOYEE VACATION SCHEDULING SYSTEM WITH VARYING PAYOUT SCHEDULES

PRIORITY

The present invention is a continuation in part of the application Ser. No. 13/856,312 which was filed on Apr. 3, 2013.

BACKGROUND

The present invention relates to online travel scheduling and purchase systems and more particularly to an online vacation scheduling and purchase system purposed for employees in a bid to make them utilize the paid leaves thereof particularly for vacations.

Employee healthcare costs that are generally incurred by employers are always substantial. A recently conducted study finds that, currently, over 300 billion dollars are spent on employee healthcare costs annually, with almost half of the expenditure being spent on stress-related illnesses. One of the primary reasons for the stress-related illnesses is the continuous work an employee is willing to commit to despite having an ample provision and freedom for taking time off of it. This 'working' on a continuous basis causes the stress to pile on obviously leading to the stress-related injuries, which, in turn, translates into the substantial healthcare expenses. For example, a study revealed that in the United States, in the year 2009, every employee, on an average, donated three days of paid leaves back to their employer which has amounted to approximately 67 billion dollars. But in return, the employers saw a staggering increase of around 97 billion dollars in their healthcare costs. So, given these figures, it is time employers take an initiative to encourage the employees thereof to use their paid leaves in the direction of vacations especially, as vacations, generally, are best at alleviating stress. This approach not only saves employers the substantial healthcare costs, but also, among other things, improves the productivity of their employees and improves the employer-employee affinity.

An additional problem is that some industries are extremely seasonal. An example of this would be the manufacture of artificial Christmas trees. In this industry, the time period right before Christmas would be extremely busy with a corresponding need for all employees to be working. The employer would not want to schedule time off during this period. In contrast, after Christmas the demand for Christmas trees would be reduced significantly. During this period of time, the employer would want to encourage employees to schedule time off.

SUMMARY

An employee vacation scheduling system may include:
(a) an employee database comprising a plurality of employee entries and a plurality of non-working calendar dates wherein, each employee entry represents an employee working for an employer and wherein, each non-working date represents a non-working day whereon, an employee is exempted from working, each employee entry associated with at least one employee paid-leave-deposit-rate wherein, a paid-leave-deposit-rate represents the number of paid leaves allotted to an employee per a predetermined length of time within a current calendar year; and
(b) a store module may include:
  (i) a selection module for enabling an employee to select a vacation travel service out of a plurality of vacation travel services, a vacation travel service spanning a predetermined number of vacation days;
  (ii) a date module for enabling the employee to mark successive vacation dates for the utilization of the vacation travel service, the vacation dates comprising an end vacation date representing the last day of the utilization of a vacation travel service; and
  (iii) a payment module for enabling the employee to purchase the vacation travel service upon determining that the number of vacation days, which represent the vacation dates and which exclude the non-working days, are lesser than or equivalent to the number of paid leaves that the employee will have by the end vacation date as determined from the at least one paid-leave-deposit-rate corresponding to the employee.

The vacation scheduling system may include that each employee entry is further associated with a paid leave entry wherein, a paid leave entry includes the total number of paid leaves an employee will have in a current calendar year, the employee database further associated with the store module such that, the number of vacation days, which are represented by the vacation dates are deducted from the total number of paid leaves of the employee upon the purchase of the vacation travel service.

The vacation scheduling system includes a conversion module for converting a paid leave of an employee into an equivalent conversion-based monetary value wherein, upon the conversion of the paid leave, the conversion-based monetary value is associated with the corresponding employee entry and the converted paid leave is deducted from total number of paid leaves of the employee; the employee database further associated with the payment module such that, an employee is enabled to utilize the sum total of conversion-based monetary value thereof towards the payment of at least a part of the price of a vacation travel service.

The vacation scheduling system may include that each employee entry may be associated with a remuneration value, which represents the remuneration of an employee; the conversion module associated with the employee database so as to determine the paid leave equivalent of conversion-based monetary value of an employee.

The vacation scheduling system may include that each employee entry being further associated with at least one blocked date entry, which represents a calendar date within the current calendar year whereon, an employee is not allowed to be on a paid leave; the employee database further associated with the date module such that, vacation dates that include a blocked date cannot be marked.

The vacation scheduling system may be integrated into the employer's Human Resources information system so as to enable the employee to log the vacation dates thereof for reporting purposes.

A vacation scheduling system may include:
(a) an employee database including a plurality of employee entries, a plurality of non-working calendar dates wherein, each employee entry represents an employee working for an employer and wherein, each non-working date represents a non-working day whereon, an employee is exempted from working, each employee entry associated with at least one employee paid-leave-deposit-rate, a current number of paid leaves, and a total number of paid leaves wherein, a paid-leave-deposit-rate represents the number of paid leaves allotted to an employee per a predetermined length of time within a current calendar year, wherein, the current number of paid leaves indicate the number of paid leaves that are currently available to the employee, and wherein, the total number of paid leaves indicate the total number of paid leaves the employee is entitled to in a current calendar year; and (b) a conversion module for converting a paid leave of an employee into an equivalent conversion-based monetary value wherein, upon the conversion of the paid leave, the conversion-based monetary value is associated with the corresponding employee entry and the converted paid leave is deducted from current number of paid leaves of the employee; and (c) a store module including:
  (i) a selection module for enabling an employee to select a vacation travel service out of a plurality of vacation travel services, a vacation travel service spanning a predetermined number of vacation days;
  (ii) a date module for enabling the employee to mark successive vacation dates for the utilization of the vacation travel service, the vacation dates comprising an end vacation date representing the last day of the utilization of a vacation travel service; and
  (iii) a payment module for enabling the employee to purchase the vacation travel service using the sum total of conversion-based monetary value thereof upon determining that the number of vacation days, which represent the vacation dates and which exclude the non-working days, are lesser than or equivalent to the number of paid leaves that the employee will be have by the end vacation date as determined from the at least one paid-leave-deposit-rate corresponding to the employee, the employee database further associated with the store module such that, the number of vacation days pertaining to the vacation travel service are deducted from the total number of paid leaves of the employee upon the purchase of the vacation travel service.

An employee vacation scheduling method may include:

(a) providing an employee database comprising a plurality of employee entries and a plurality of non-working calendar dates wherein, each employee entry represents an employee working for an employer and wherein, each non-working date represents a non-working day whereon, an employee is exempted from working, each employee entry associated with at least one employee paid-leave-deposit-rate wherein, a paid-leave-deposit-rate represents the number of paid leaves allotted to an employee per a predetermined length of time within a current calendar year; and (b) providing a store module comprising:
  (i) a selection module for enabling an employee to select a vacation travel service out of a plurality of vacation travel services, a vacation travel service spanning a predetermined number of vacation days;
  (ii) a date module for enabling the employee to mark successive vacation dates for the utilization of the vacation travel service, the vacation dates comprising an end vacation date representing the last day of the utilization of a vacation travel service; and
  (iii) a payment module for enabling the employee to purchase the vacation travel service upon determining that the number of vacation days, which represent the vacation dates and which exclude the non-working days, are lesser than or equivalent to the number of paid leaves that the employee will have by the end vacation date as determined from the paid-leave-deposit-rate corresponding to the employee.

The vacation scheduling method may have each employee entry being further associated with a paid leave entry wherein, a paid leave entry comprises the total number of paid leaves an employee will have in a current calendar year, the employee database further associated with the store module such that, the number of vacation days, which are represented by the vacation dates are deducted from the total number of paid leaves of the employee upon the purchase of the vacation travel service.

The vacation scheduling method may include a conversion module for converting a paid leave of an employee into an equivalent conversion-based monetary value wherein, upon the conversion of the paid leave, the conversion-based monetary value is associated with the corresponding employee entry and the converted paid leave is deducted from total number of paid leaves of the employee; the employee database further associated with the payment module such that, an employee is enabled to utilize the sum total of conversion-based monetary value thereof towards the payment of at least a part of the price of a vacation travel service.

The vacation scheduling method may have each employee entry being further associated with a remuneration value, which represents the annual remuneration of an employee; the conversion module associated with the employee database so as to determine the paid leave equivalent of conversion-based monetary value of an employee.

The vacation scheduling method may have each employee entry being further associated with at least one blocked date entry, which represents a calendar date within the current calendar year whereon, an employee is not allowed to be on a paid leave; the employee database further associated with the date module such that, vacation dates that include a blocked date cannot be marked.

The vacation scheduling method may have the date module to be integrated into the employer's Human Resources information system so as to enable the employee to log the vacation dates thereof for reporting purposes.

A vacation scheduling method may include:

(a) providing an employee database comprising a plurality of employee entries, a plurality of non-working calendar dates wherein, each employee entry represents an employee working for an employer and wherein, each non-working date represents a non-working day whereon, an employee is exempted from working, each employee entry associated with at least one employee paid-leave-deposit-rate, a current number of paid leaves, and a total number of paid leaves wherein, a paid-leave-deposit-rate represents the number of paid leaves allotted to an employee per a predetermined length of time within a current calendar year, wherein, the current number of paid leaves indicate the number of paid leaves that are currently available to the employee, and wherein, the total number of paid leaves indicate the total number of paid leaves the employee is entitled to in a current calendar year; and (b) providing a conversion module for converting a paid leave of an employee into an equivalent conversion-based monetary value wherein, upon the conversion of the paid leave, the conversion-based monetary value is associated with the corresponding employee entry and the converted paid leave is deducted from current number of paid leaves of the employee; and (c) providing a store module including:
  (i) a selection module for enabling an employee to select a vacation travel service out of a plurality of vacation travel services, a vacation travel service spanning a predetermined number of vacation days;
  (ii) a date module for enabling the employee to mark successive vacation dates for the utilization of the vacation travel service, the vacation dates comprising an end vacation date representing the last day of the utilization of a vacation travel service; and (iii) a payment module for enabling the employee to purchase the vacation travel service using the sum total of conversion-based monetary value thereof upon determining that the number of vacation days, which represent the vacation dates and which exclude the non-working days, are lesser than or equivalent to the number of paid leaves that the employee will be have by the end vacation date as determined from the at least one paid-leave-deposit-rate corresponding to the employee, the employee database further associated with the store module such that, the number of vacation days pertaining to the vacation travel service are deducted from the total number of paid leaves of the employee upon the purchase of the vacation travel service The present invention is a computer-based employee vacation scheduling system and method for enabling an employee working for an employer to schedule and purchase vacation travel services, such as vacation packages, on the basis of the availability of the paid leaves thereof. An embodiment of the scheduling system comprises employee database comprising a plurality of employee entries wherein, each employee entry represents an employee. Further, each employee entry is associated with the total number of paid leaves that are currently available to the corresponding employee. The scheduling system further comprises a store module that actually enables an employee to purchase a vacation travel service out of a plurality of vacation travel services wherein, a vacation travel service spans a predetermined number of vacation days. The employee database is associated with the store module in such a way that, the payment for the vacation travel service is processed only when the total number of vacation days are lesser than or equivalent to the total number of the paid leaves of the employee that are available. The number of vacation days is deducted from the total available number of paid leaves once the vacation travel service is purchased.

Other objects and advantages of the embodiments herein will become readily apparent from the following detailed description taken in conjunction with the accompanying drawings.

BRIEF DESCRIPTIONS OF THE DRAWINGS

FIG. 3 is an exemplary screenshot of listed vacation travel services according to an embodiment of the present invention.

FIG. 6 is a flowchart representing the logic employed by the conversion module according to an embodiment of the present invention.

FIGURES—REFERENCE NUMERALS

Figure 1:
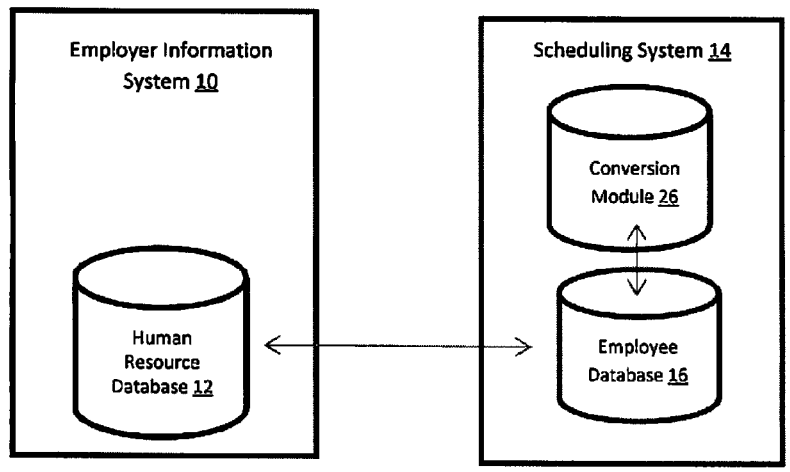
FIG. 1 is a block diagram depicting the arrangement between employer information system and the scheduling system according to an embodiment of the present invention.

10 . . . Employer Information System
12 . . . Human Resources Database
14 . . . Employee Vacation Scheduling System
16 . . . Employee Database
18 . . . Store Module
20 . . . Selection Module
22 . . . Date Module
24 . . . Payment Module
26 . . . Conversion Module
28 . . . Eligibility Module

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention comprises a computer-based employee vacation scheduling system (hereinafter, "scheduling system"), which may be best run as a third-party service provider that serves employers and the employees thereof. The scheduling system, preferably accessed over the Internet, enables an employee working for a registered employer to schedule and purchase a vacation travel service or services out of a plurality of vacation travel services. A vacation travel service, which spans a predetermined amount of time ranging from a few hours to several days, may comprise a travel service such as a one way air travel, or a short-spanned treatment, such as a spa session, or, on the other hand, may comprise a few to several individual services combined into a package that may define an entire itinerary. The combination of such services may comprise, for instance, a to-and-fro air travel, hotel stay, and a plurality of fun programs or activities that are scheduled between the to-and-fro air travel.

The registered employer, as the term suggests, comprises an employer that has registered with the scheduling system by providing employer information, such as the employer identity, addresses, number of employees working therefor, type of business, type of products/services offered, and etc. In some cases, a registration fee might be charged in order for the registration to be complete. The scheduling system comprises a user interface for enabling a user to interact therewith and an employee database comprising a plurality of non-working dates wherein, each non-working date represents a non-working day, such as a public holiday or a weekend, whereon, an employee is exempted from working. The employee database further comprises a plurality of the employee entries wherein, each employee entry is associated with at least one employee paid-leave-deposit-rate. An employee entry represents an employee working for the employer wherein, the employee is identified by an employee name or an employee identification number or code, or the like.

The paid-leave-deposit-rate associated with each employee entry comprises the number of paid leaves allotted to an employee per a predetermined length of time within a period of time defined, such that, the sum of each predetermined length of time pertaining to each of the at least one paid-leave-deposit-rate is equivalent to the time span of the current calendar year. The paid-leave-deposit-rate might vary from one group of employees to another working for the same employer or even might vary from one employee to another working for the same employer as the paid-leave-deposit-rate is set according to the discretion of the employer so as to, after all, obtain optimum benefit. For example, in an organization (run by an employer), the top management might have a more generous paid-leave-deposit-rate compared to the rest of the employees. Generally, paid leaves are allotted to employees in two ways, viz., an upfront method and an accrual method. In the upfront method, as the term suggests, the employee is 'paid' upfront with the total number of paid leaves he/she is entitled to in a current calendar year. For example, if an employee is entitled to 30 days of paid leave within a current calendar year, those 30 days are provided upfront by the employer allowing the employee to make use of the leaves anytime with the current calendar year. Therefore, the paid-leave-deposit-rate for the above example comprises 30 days per 12 months.

The accrual method is further categorized into a linear and a non-linear accrual method. In the linear accrual method, a specific number of leaves are granted to an employee per a specific time period within a current calendar year wherein, the specific number of leaves and the specific time period are constant throughout the current calendar year. For example, if the employee is entitled to 30 days of paid leave within a current calendar year, by the linear accrual method, 2.5 days of leave are accrued by the employee at the beginning of every month. So, in this case, the paid-leave-deposit-rate is 2.5 days per month (throughout the year). However, in the non-linear method, the number of paid leaves that will be accrued and/or the frequency at which the paid leaves are accrued varies. Considering the earlier example of 30 days of paid leave being allotted to an employee within a current calendar year, in case of non-linear accrual method, an employee may, for example, accrue 1.5 days of paid leave every month for the first 6 months, and then, accrue 3.5 days for paid leave every month for the rest of the calendar year. Now, in this case, the paid-leave-deposit-rates are 1.5 days per month for the first 6 months and 3.5 days per month for the rest of the current calendar year. In another example, the employee may be granted 15 days of paid leave upfront, and may accrue 1.25 days of paid leave every month throughout the current calendar year. And in this particular example, the paid-leave-deposit-rates would be 16.25 (15+1.25) days per month for the first month followed by 1.25 days per month for the rest of the eleven months. In yet another example, where the employee may not be eligible for any paid leaves for the initial six months, but becomes entitled to them thereafter, the paid-leave-deposit-rates comprise 0 days per first 6 months followed by 30 days per the remaining 6 months.

Each employee entry in the employee database is further associated with a number of used paid leaves and a number of carried-over paid leaves wherein, a used paid leave comprises a paid leave that is 'used up' by the employee and wherein, a carried-over paid leave comprises an unused paid leave that is carried forward from the previous calendar year or years. In one embodiment, the scheduling system is configured such that, as the paid leaves are utilized by an employee, the number of used paid leaves are deducted first from the carried over paid leaves followed by the deduction from the paid leaves that are accumulated in the current calendar year. However, in case, there is no such provision for the paid leaves to be carried over to next calendar year, the carried-over paid leaves column in the employee database simply reflects a zero and the used paid leaves are deducted from the paid leaves that are accumulated in the current calendar year. Simultaneously, the paid leaves that are utilized by the employee added to the number of used paid leaves associated with the corresponding employee entry. The employee information provided by the employee database (comprising the employee entries, paid-leave-deposit rate, the number of used paid leaves, and the number of carried-over paid leaves) is generally available within the employer's Human Resources (HR) database of the employer information system.

Therefore, in one embodiment, as seen in FIG. 1, the employer information system 10 that comprises the HR database 12 is interfaced and integrated with the scheduling system 14 such that, the employee information in the HR database 12 can simply be routed into the employee database 16 of the scheduling system 14. In this embodiment, as the scheduling system 14 is integrated into the employer information system 10, an employee may have to access the scheduling system 14 only through the employer information system 10. FIG. 1 additionally illustrates that the employee may access the conversion module 26 to convert the unused vacation time to an equivalent monetary value. The database 16 of the scheduling system 14 may include the value of each paid leaves (day or other increment) based on the remuneration schedule of the employee. The remuneration schedule may be tailored for each individual employee when the employee makes his selection or when the employee is to receive the benefit/payment and may vary by the time of day, may vary by shift, may vary by date, may vary by week, may vary by month, or may vary by season (which can be variably defined to meet the needs of the employer) or by any combination. Different employees may have different equivalent monetary values for the same unused vacation time). The system may be designed to allow employers to apply various exchange rates on that vacation time throughout the year to create incentives or disincentives for when employees take time off, based upon the employer's seasonal workforce demands and set by the employer.

Referring to the example of the manufacturer of artificial Christmas trees, the biggest demands on productivity would be the months leading up to and during the Christmas selling season (for example July-December). However, from late January through June, there may not even be enough work to go around. Therefore, the manufacturer would get better utilization of their workforce if they could incent their employees to do most of their travel in the first 6 months of the year. So, they might set the following exchange rates in the system:

January 15-June 30: 1.15×employee hourly rate

July 1-January 14: 0.75×employee hourly rate

The logic behind paying a premium for the employees' vacation time during the seasonally slow period is to potentially avoid or reduce overtime wages (which carry an implicit exchange rate of 1.50) during the times of peak productivity demands.

Another example, a janitor who converts the unused vacation time may have a relatively low equivalent monetary value. In contrast, an executive employee who converts the same amount of unused vacation time may have a relatively high equivalent monetary value. Consequently, the conversion of the unused vacation time to equivalent monetary value may be based on the importance/status of the employee.

FIG. 6 illustrates the logic associated with the conversion model 26 where in step 601 the total available paid leaves available to the employee is determined. In step 603, the value of each paid leaves (day or other increment) based on the remuneration schedule of the employee and any discount or supplemental factors applied by the employer is determined, and in step 605, the employee elects/selects the number of paid leaves to be converted. In step 607, the equivalent monetary value of the unelected/selected paid leaves is determined and credited (on a regular basis) to an escrow account for the benefit of the employee (or may be applied toward the balance of the travel purchase or other good or service purchase selected from the store module 18). The employer is notified of the election of the employee and will remit funds to the fulfillment provider to affect the value transfer.

Figure 2:
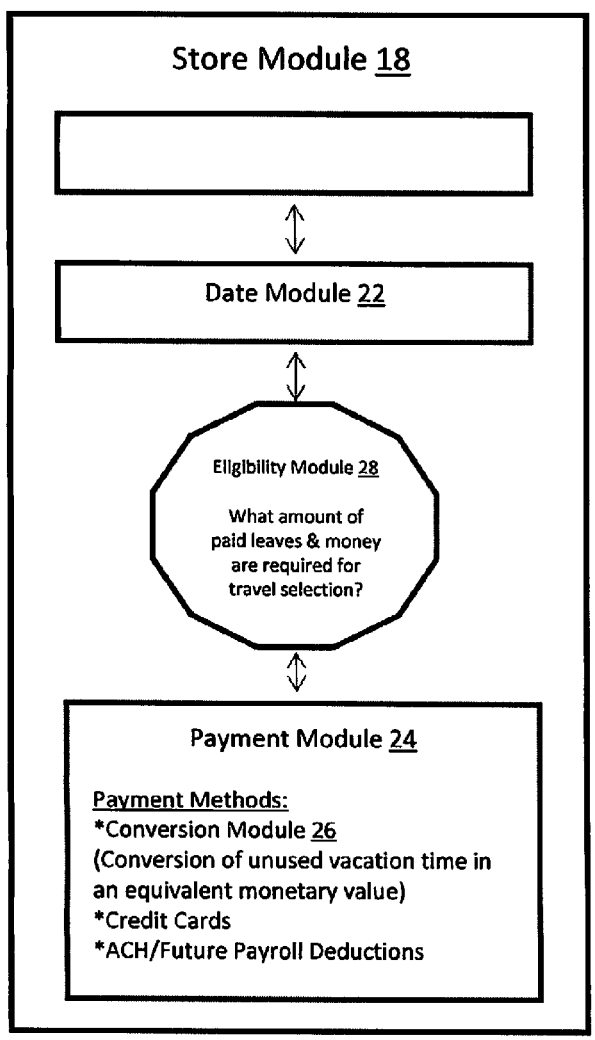
FIG. 2 is a block diagram of the store module according to the preferred embodiment of the present invention.

The scheduling system further comprises a store module 18 for enabling an employee to schedule and thereafter purchase a vacation travel service out of a plurality of vacation travel services, as well as other products and services that may or may not be used in conjunction with a purchased travel service, based on the paid leaves thereof. Each of the vacation travel services is broken down into various fields while being input into the store module (for sale) so as to enable an employee to search and sort the vacation travel services on the basis of the type of service, price, the duration of the vacation travel service, the destination of the vacation travel service, and etc, thus enabling the employee to arrive at his/her desired vacation travel service quicker and easier. Referring to FIG. 2, the store module 18 comprises a selection module 20, a date module 22, and eligibility module 28 and a payment module 24. The selection module 20 enables an employee to select a vacation travel service out of a plurality of vacation travel services available in the store module 18. The selection module 20 may simply comprise a hyperlink marked as, for example, "Book," as seen in FIG. 3 that directs the employee to a place where he/she can assign or mark successive vacation dates for the utilization of the selected vacation travel service as enabled by the date module 22.

The date module 22 preferably comprises a calendar application for marking successive vacation dates for the utilization of the vacation travel service wherein, the vacation dates represent the vacation days, the vacation travel service spans. The vacation dates comprise a start vacation date and an end vacation date wherein, the start and the end vacation dates represent the first and the last day of the utilization of the vacation travel service respectively. In one embodiment, the calendar application is configured in such a way that, the employee only needs to mark the start vacation date whereupon, the rest of the successive vacation dates are marked automatically. Once the vacation dates are marked by the employee, he/she may be directed to the eligibility module 28 in order to determine the amount of paid leaves and money are required for the travel selection. Subsequently, he/she is directed to the payment module 24 upon activating or clicking on a purchase hyperlink marked, for example, as "Buy." The payment module 24, in turn, comprises a paid leaves module that is in communication with the employee database. The paid leaves module is instrumental in enabling the payment module to process the payment towards the purchase of a vacation travel service. The paid leaves module is configured to determine the number of paid leaves the employee will have by the end vacation date based on the paid-leave-deposit-rate, the number of carried-over paid leaves and the number of used paid leaves thereof. For example, if the paid-leave-deposit-rate of the employee is 2.5 paid leaves per month throughout the current calendar year, the end vacation date is in September (month #9), and the employee, has 3 days of carried-over paid leaves, and has so far used up 4 days of paid leave, then the number of paid leaves of the employee will have by the end vacation date is 21.5 (((2.5×9)+3)−4)) days. In another example, if the paid-leave-deposit-rate of the employee is 1.5 days per month for the first six months followed by 3.5 days per month for the rest of the months, the end vacation date is in the month of September, and the employee has 3 days of carried-over paid leaves, and has so far used up 4 days of paid leave, then the number of paid leaves the employee will have by the end vacation date is 18.5 ((((1.5×6)+(3.5×3))+3)−4) days.

Figure 4:
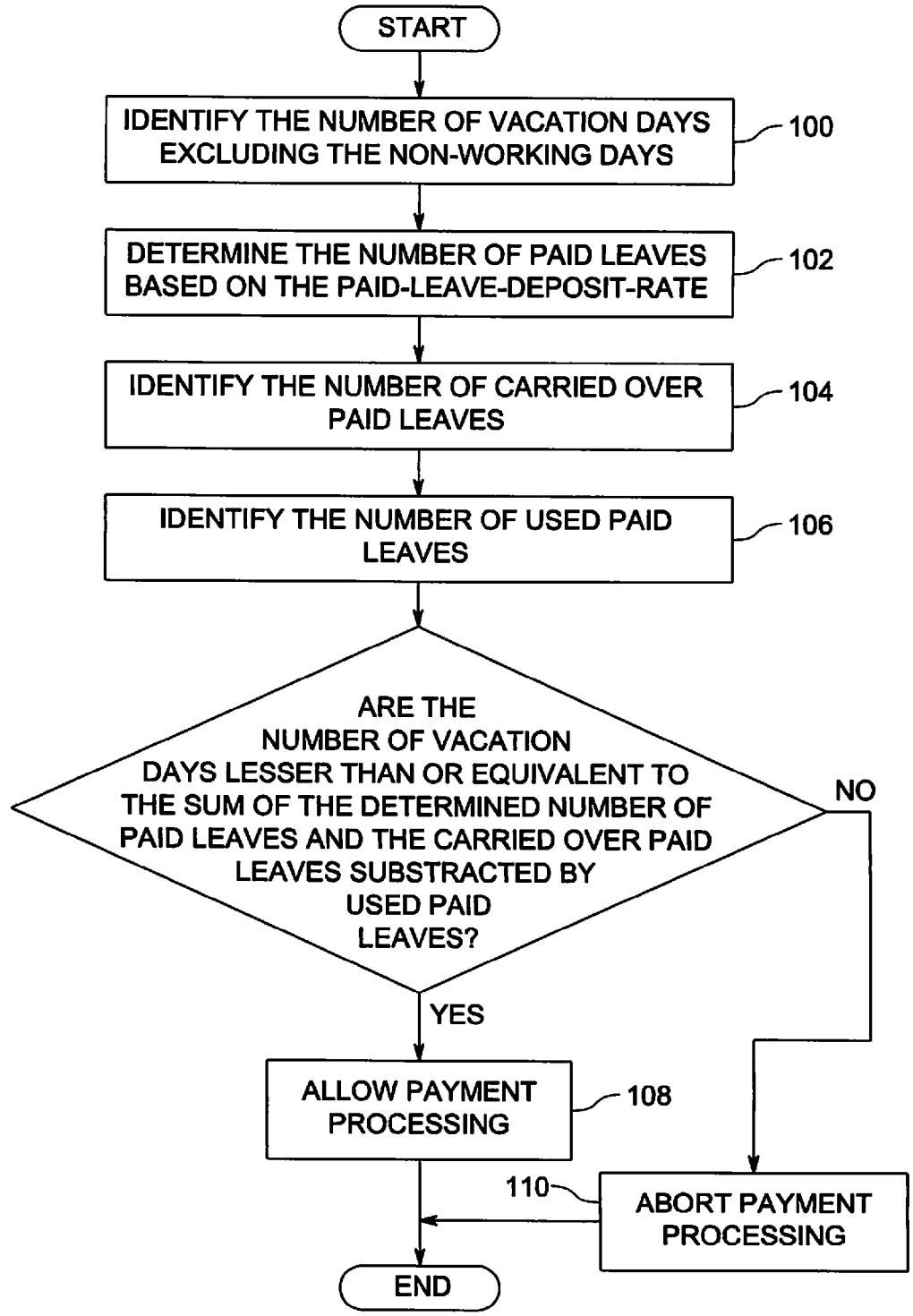
FIG. 4 is a flowchart representing the logic employed by the paid leaves module according to the preferred embodiment of the present invention.

Referring to FIG. 4—a representation of the logic executed by the paid leaves module—the paid leaves module is initiated with identifying the number of vacation days pertaining to the vacation travel service at step 100 wherein, the number of vacation days is exclusive of the non-working days. Once the number of vacation days is identified, the number of paid leaves the employee will have by the end vacation date is determined using the paid-leave-deposit-rate of the employee at step 102 as shown in the earlier examples. Simultaneously, the number of carried-over paid leaves and used paid leaves of the employee are identified from the employee database at steps 104 and 106 respectively. At this point, the paid leaves module determines whether or not the number of vacation days, excluding the non-working days, are lesser than or equivalent to the sum of the number paid leaves the employee will have by the end vacation date (as determined by the paid-leave-deposit-rate) and the number of carried-over paid leaves subtracted by the used paid leaves. The payment is processed at step 108 upon determining that the number of vacation days, excluding the non-working days, are indeed lesser than or equivalent to the sum of the number paid leaves the employee will have by the end vacation date and the number of carried-over paid leaves subtracted by the used paid leaves. WDS However, the payment process is aborted at step 110 if the number of vacation days, excluding the non-working days, are greater than the sum of the number paid leaves the employee will have by the end vacation date and the number of carried-over paid leaves subtracted by the used paid leaves. In one embodiment, the paid leaves module is associated with the date module instead of the payment module such that, the employee is not allowed to progress any further if the number of vacation days (excluding non-working days) is greater than the sum of number paid leaves the employee will have by the end vacation date and the number of carried-over paid leaves subtracted by the used paid leaves.

Conventional payment means such as, credit cards, debit cards, Internet banking, and etc, may be accepted by the payment module for the payment towards the payment purposes once the payment processing is allowed by the paid leaves module. In one embodiment, the payment module is associated with the employee's banking account, where his/her salary is credited such that, the payment for the vacation travel service, upon the consent of the employee, is deducted from the payroll thereof. In one embodiment, the payment may be deducted in monthly installments for the convenience of the employee.

Each employee entry of the employee database is further associated with a number of current year paid leaves, a number of total current paid leaves, a number of current entitled paid leaves, and a number of total entitled paid leaves. The number of current year paid leaves comprises the number of paid leaves pertaining to the current calendar year that the employee currently possesses. The number of total current paid leaves comprises the sum of the number of carried-over paid leaves and the number of current year paid leaves. The number of current entitled paid leaves comprises the number of paid leaves pertaining to the current calendar year that the employee will have by the end of the current calendar year. The number of total entitled paid leaves comprises the sum of the number of carried-over paid leaves and the number of current entitled paid leaves. The scheduling system is configured such that, when a paid leave is used by an employee, the used paid leave is first deducted from the number of carried-over paid leaves.

In case of all the carried-over paid leaves being exhausted, the used paid leave will be deducted from the number of current year paid leaves and the number of current entitled paid leaves simultaneously. Notably, in case of an upfront method being employed by employer, the number of total current paid leaves is equivalent to the number of total entitled paid leaves as the number of current year paid leaves is equivalent to the number of current entitled paid leaves.

Once the vacation travel service is purchased by the employee, the total number of vacation days (excluding the non-working days) pertaining thereto, as explained earlier, is deducted from the number of carried-over paid leaves first. If the number of vacation days exceeds the number of carried-over paid leaves or in case of unavailability of the carried-over paid leaves, the number of vacation days is subtracted from the number of current year paid leaves even to the point where the number of current year paid leaves represent a negative value implying that the remaining vacation days will be deducted from current year paid leaves as they are accrued by the employee within the current calendar year. The number of vacation days is also subtracted from the number of current entitled paid leaves simultaneously along with the number of current year paid leaves. Further, the number of vacation days (excluding the non-working days) are added to the number of used paid leaves pertaining to the employee entry. In one embodiment where the scheduling system is integrated into the employer information system, the scheduling system is configured such that, once a vacation travel service is purchased by an employee, the vacation dates, whereon the employee will be obviously unavailable, are automatically updated into the HR database so as to enable other employees that are professionally related to the employee to plan and organize the work activities thereof accordingly.

Figure 5:
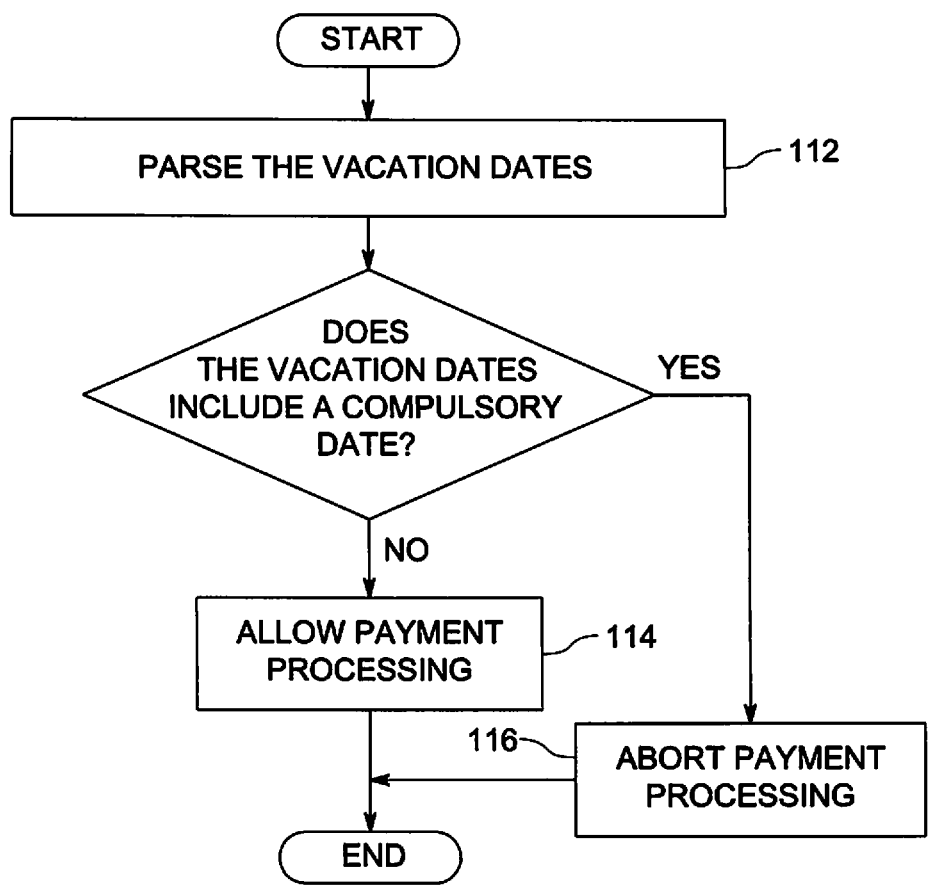
FIG. 5 is a flowchart representing the logic employed by the compulsory module according to an embodiment of the present invention.

In one embodiment, each employee entry, or a group or groups of employee entries, or all employee entries are further associated with a compulsory calendar date or dates wherein, a compulsory date represents a compulsory day, which comprises a day on which, an employee is not allowed to be on leave, including especially a paid leave. In this embodiment, the payment module further comprises a compulsory module, which is in communication with the employee database. Referring to FIG. 5, the compulsory module is initiated with scanning or parsing of the vacation dates marked by the employee for the utilization for the vacation travel service at step 112. Upon parsing, the compulsory module, which is in communication with the employee database, determines whether or not the vacation dates include a compulsory date. The payment process is aborted if the vacation dates indeed include a compulsory date as seen in step 114. And if the vacation dates does not include a compulsory date, the payment towards the purchase of the vacation travel service is allowed to be processed as seen in step 116. The compulsory module is preferably set to be activated before the activation of the paid leaves module as the logic executed by the compulsory module is relatively simpler whereby, the processing power consumed therefor is relatively lesser. In one embodiment, the compulsory module is associated with the date module instead of the payment module such that, the employee is not allowed to progress any further if the marked vacation dates include a compulsory date. The employee may be prompted to re-mark his/her vacation dates if the marked vacation dates include a compulsory date.

In one embodiment, the scheduling system further comprises a conversion module for converting a paid leave of an employee into an equivalent monetary value referred to as "vacation money" hereinafter. In one embodiment, the conversion module is configured to be used only by employers for converting the unused paid leaves into equivalent vacation money. However, alternatively, the conversion module is set to be utilized by employees themselves. Preferably, the vacation money cannot be exchanged for actual money, but can only be used towards making purchases on the scheduling system, thus incentivizing the employees to make use of the scheduling system. The scheduling system is preferably configured such that, only the paid leaves that are available to the employee, i.e., the total current paid leaves, are allowed for conversion. In other words, the paid leaves that are yet to be accrued by an employee typically cannot be converted, unless, the employer has specifically designed their paid leave system to allow employees to convert future vacation time that has yet to be accrued, but will be accrued by the time of the scheduled travel. The scheduling system is configured such that, the number of converted paid leaves are deducted from the number of carried-over paid leaves first. If the converted paid leaves exceed the number of carried-over paid leaves or in case of unavailability of the carried-over paid leaves, the converted paid leaves are subtracted from the number of current year paid leaves. The number of converted paid leaves is also subtracted from the number of current entitled paid leaves simultaneously along with the number of current year paid leaves. Further, the number of converted paid leaves is added to the number of used paid leaves pertaining to the employee entry. In this embodiment, each employee entry is further associated with total vacation money, which represents total amount of vacation money the corresponding employee possesses as a result of paid leave conversions. The scheduling system is configured such that, upon conversion, the corresponding vacation money is added to the total vacation money in the employee database.

The employee database is further associated with the payment module such that, an employee is enabled to purchase a vacation travel service using his/her vacation money. Once paid, the price of the vacation travel service is deducted from the total vacation money of the employee. In case, where the price of the vacation travel service is higher than the total vacation money of the employee, the employee may be allowed to pay the rest of the price via other payment means, such as a credit card, debit card, Internet Banking, etc. and/or establish payroll deductions to automatically withhold, in an escrowed salary account, the necessary amount from each pay period occurring until the time of travel in order to acquire sufficient funds for that employee to pay the remaining trip expenses by the time they are due for the travel. Further, in this embodiment, each employee entry in the employee database is further associated with a remuneration value, which represents the remuneration of each employee. The conversion module is associated with the employee database so as to determine the amount of vacation money that is equivalent to the paid leave of an employee. For example, if the remuneration of an employee is, say, $120,000 per annum and if there are a total of 250 working days in a current calendar year, then the amount of vacation money equivalent to a paid leave thereof is $480 (120,000÷250). In other embodiments, a factor may be used by the employer to customize the conversion module per the employer's seasonal workforce demands. For example, if the remuneration of an employee is $120,000 per annum and there are total of 250 working days in a current calendar year; however, the $2^{nd}$ half of the year is seasonally busier than the first, the employer might allow a 100% conversion of time for the first 125 days ($480 value per day), but a 75% conversion the $2^{nd}$ half of the year ($360: $480×75%) to incent vacation utilization in the first half of the year.

The present invention comprises a computer-based employee vacation scheduling method for enabling an employee working for an employer to schedule and purchase a vacation travel service or services out of a plurality of vacation travel services. A vacation travel service, which spans a predetermined amount of time ranging from a few hours to several days, may comprise a travel service such as a one way air travel, or a short-spanned treatment, such as a spa session, or, on the other hand, may comprise a few to several individual services combined into a package that may define an entire itinerary.

The scheduling method comprises providing an employee database comprising a plurality of non-working dates wherein, each non-working date represents a non-working day whereon, an employee is exempted from working. The employee database further comprises a plurality of the employee entries wherein, each employee entry is associated with at least one employee paid-leave-deposit-rate. An employee entry represents an employee working for the employer and the paid-leave-deposit-rate represents the number of paid leaves allotted to an employee per a predetermined length of time within a current calendar year, the sum of each predetermined length of time pertaining to each of the at least one paid-leave-deposit-rate being equivalent to the time span of the current calendar year. Generally, paid leaves are allotted to employees in two ways, viz., an upfront method and an accrual method. In the upfront method, as the term suggests, the employee is 'paid' upfront with the total number of paid leaves he/she is entitled to in a current calendar year. The accrual method is further categorized into a linear and a non-linear accrual method. In the linear accrual method, a specific number of paid leaves are granted to an employee per a specific time period within a current calendar year wherein, the specific number of paid leaves and the specific time period are constant throughout the current calendar year. However, in the non-linear method, the specific number of paid leaves and the specific time periods at which the specific number of leaves are granted varies.

Each employee entry in the employee database is further associated with a number of used paid leaves and a number of carried-over paid leaves wherein, a used paid leave comprises a paid leave that is 'used up' by the employee and wherein, a carried-over paid leave comprises an unused paid leave that is carried forward from the previous calendar year or years. The employee information provided by the employee database (comprising the employee entries, paid-leave-deposit rate, the number of used paid leaves, and the number of carried-over paid leaves) is generally available within the employer's Human Resources (HR) database of the employer information system. Therefore, in one embodiment, the employer information system that comprises the HR database is associated or integrated with the employee database such that, the pertinent information in the HR database can simply be routed into the employee database.

The scheduling method further comprises the step of providing a store module for enabling an employee to schedule and thereafter purchase a vacation travel service out of a plurality of vacation travel services based on the paid leaves thereof wherein, the store module comprises a selection module, a date module, and a payment module. The selection module enables an employee to select a vacation travel service out of a plurality of vacation travel services available in the store module. The selection module may simply comprise a hyperlink marked as, for example, "Book," that directs the employee to a place where he/she can assign or mark successive vacation dates for the utilization of the selected vacation travel service as enabled by the date module.

The date module preferably comprises a calendar application for marking successive vacation dates for the utilization of the vacation travel service. The vacation dates comprise a start vacation date and an end vacation date wherein, the start and the end vacation dates represent the first and the last day of the utilization of the vacation travel service respectively. Once the vacation dates are marked by the employee, he/she is directed to the payment module upon activating or clicking on a purchase hyperlink marked, for example, as "Buy." The payment module, in turn, comprises a paid leaves module that is in communication with the employee database. The paid leaves module is instrumental in enabling the payment module to process the payment towards the purchase of a vacation travel service. The paid leaves module is configured to determine the number of paid leaves the employee will have by the end vacation date based on the paid-leave-deposit-rate, the number of carried-over paid leaves and the number of used paid leaves thereof. For example, if the paid-leave-deposit-rate of the employee is 2.5 paid leaves per month throughout the current calendar year, the end vacation date is in September (month #9), and the employee, has 3 days of carried-over paid leaves, and has so far used up 4 days of paid leave, then the number of paid leaves of the employee will have by the end vacation date is 21.5 (((2.5×9)+3)−4)) days. In another example, if the paid-leave-deposit-rate of the employee is 1.5 days per month for the first six months followed by 3.5 days per month for the rest of the months, the end vacation date is in the month of September, and the employee has 3 days of carried-over paid leaves, and has so far used up 4 days of paid leave, then the number of paid leaves the employee will have by the end vacation date is 18.5 (((((1.5×6)+(3.5×3))+3)−4) days.

Once the number of paid leaves by the end vacation date is determined, the paid leaves module determines whether or not the number of vacation days, excluding the non-working days, are lesser than or equivalent to the sum of the number paid leaves the employee will have by the end vacation date and the number of carried-over paid leaves subtracted by the used paid leaves. The payment is processed only upon determining that the number of vacation days, excluding the non-working days, are indeed lesser than or equivalent to the sum of the number paid leaves the employee will have by the end vacation date and the number of carried-over paid leaves subtracted by the used paid leaves. Conventional payment means such as, credit cards, debit cards, Internet banking, and etc, may be accepted by the payment module for the payment towards the payment purposes once the payment processing is allowed by the paid leaves module. In one embodiment, the payment module is associated with the employee's banking account, where his/her salary is credited such that, the payment for the vacation travel service, upon the consent of the employee, is deducted from the payroll thereof.

Each employee entry is further associated with a number of current year paid leaves, a number of total current paid leaves, a number of current entitled paid leaves, and a number of total entitled paid leaves. The number of current year paid leaves comprises the number of paid leaves pertaining to the current calendar year that the employee currently possesses. The number of total current paid leaves comprises the sum of the number of carried-over paid leaves and the number of current year paid leaves. The number of current entitled paid leaves comprises the number of paid leaves pertaining to the current calendar year that the employee will have by the end of the current calendar year. The number of total entitled paid leaves comprises the sum of the number of carried-over paid leaves and the number of current entitled paid leaves. Notably, in case of an upfront method being employed by employer, the number of total current paid leaves is equivalent to the number of total entitled paid leaves as the number of current year paid leaves is equivalent to the number of current entitled paid leaves.

Once the vacation travel service is purchased by the employee, the total number of vacation days (excluding the non-working days) pertaining thereto is deducted from the number of carried-over paid leaves first. If the number of vacation days exceeds the number of carried-over paid leaves or in case of unavailability of the carried-over paid leaves, the number of vacation days is subtracted from the number of current year paid leaves even to the point where the number of current year paid leaves represent a negative value implying that the remaining vacation days will be deducted from current year paid leaves as they are accrued by the employee within the current calendar year. The number of vacation days is also subtracted from the number of current entitled paid leaves simultaneously along with the number of current year paid leaves. Further, the number of vacation days (excluding the non-working days) are added to the number of used paid leaves pertaining to the employee entry. In one embodiment, the scheduling method of claim further comprises the step of associating the store module with an employer information system so as to log the vacation dates of the employee, upon the purchase of the vacation travel service, into the employer information system for Human Resources reporting purposes.

In one embodiment, each employee entry is further associated with a compulsory calendar date or dates wherein, a compulsory date represents a day on which, an employee is not allowed to be on a paid leave. In this embodiment, the payment module further comprises a compulsory module, which is in communication with the employee database. The compulsory module is configured such that the payment process is aborted if the marked vacation dates indeed include a compulsory date.

In one embodiment, the scheduling method further comprises the step of providing a conversion module for converting a currently available paid leave of an employee into an equivalent monetary value referred to as "vacation money" hereinafter. The vacation money is set to be used only towards making purchases on the scheduling system, thus incentivizing the employees to make use of the scheduling system. Upon conversion, the number of converted paid leaves is deducted from the number of carried-over paid leaves first. If the converted paid leaves exceed the number of carried-over paid leaves or in case of unavailability of the carried-over paid leaves, the converted paid leaves are subtracted from the number of current year paid leaves. The number of converted paid leaves is also subtracted from the number of current entitled paid leaves simultaneously along with the number of current year paid leaves. Further, the number of converted paid leaves is added to the number of used paid leaves pertaining to the employee entry. In this embodiment, each employee entry is further associated with total vacation money, which represents total amount of vacation money the corresponding employee possesses as a result of paid leave conversions. Upon a paid leave conversion, the resultant vacation money is added to the total vacation money in the employee database.

The employee database is further associated with the payment module such that, an employee is enabled to purchase a vacation travel service using his/her vacation money. Once paid, the price of the vacation travel service is deducted from the total vacation money of the employee. In case, where the price of the vacation travel service is higher than the total vacation money of the employee, the employee may be allowed to pay the rest of the price via other payment means, such as a credit card, debit card, Internet Banking, and etc. Further, in this embodiment, each employee entry in the employee database is further associated with a remuneration value, which represents the remuneration of each employee. The conversion module is associated with the employee database so as to determine the amount of vacation money that is equivalent to the paid leave of an employee.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. An employee vacation scheduling computer system comprising:
   (a) an employee database comprising a plurality of employee entries and a plurality of non-working calendar dates wherein, each employee entry represents an employee working for an employer and wherein, each non-working date represents a non-working day, which comprises a day whereon an employee is exempted from working, each employee entry associated with at least one employee paid-leave-deposit-rate and a number of used paid leaves, wherein, a paid-leave-deposit-rate represents the number of paid leaves allotted to an employee per a predetermined length of time within a current calendar year, the sum of each predetermined length of time pertaining to each of the at least one paid-leave-deposit-rate being equivalent to the time span of the current calendar year, and wherein, a used paid leave represents a paid leave utilized by an employee; and
   (b) a store module for enabling an employee to purchase a vacation travel service out of a plurality of vacation travel services, a vacation travel service spanning a predetermined number of vacation days, the store module comprising:
      (i) a date module for enabling the employee, in the process of purchasing the vacation travel service, to mark successive vacation dates for the utilization of the vacation travel service, the vacation dates comprising an end vacation date representing the last day of the utilization of a vacation travel service; and
      (ii) a payment module in communication with the employee database and comprising a paid leaves module and a compulsory module, the payment module for enabling the employee to pay for the vacation travel service upon:
         determining, by the paid leaves module, that the number of vacation days, which pertain to the vacation dates and which exclude the non-working days, are lesser than or equivalent to the sum of the number of paid leaves that the employee will be have by the end vacation date as determined from the at least one paid-leave-deposit-rate corresponding to the employee and a number of carried-over paid leaves that corresponds to the employee subtracted by the number of used paid leaves, and determining, by the compulsory module, the vacation dates do not include a compulsory date, the compulsory module being activated before the paid leaves module such that the computer system consumes less processing power;

wherein, the number of carried-over paid leaves are associated with each employee entry, a carried-over paid leave representing an unused paid leave of an employee that is carried over from a previous calendar year or years;

(iii) a conversion module for converting a currently available paid leave of an employee into an equivalent monetary value being variable based upon a selected day wherein unused vacation time is a payment within the payment module.

2. The vacation scheduling system of claim 1 wherein, the equivalent monetary value being variable based upon a selected shift.

3. The vacation scheduling system of claim 1 wherein, the equivalent monetary value being variable based upon a date.

4. The vacation scheduling system of claim 1 wherein, the equivalent monetary value being variable based upon a week.

5. The vacation scheduling system of claim 1 wherein, the equivalent monetary value being variable based upon a month.

6. The vacation scheduling system of claim 1 wherein, the equivalent monetary value being variable based upon a season.

7. An employee vacation scheduling computer system comprising:

(a) an employee database comprising a plurality of employee entries and a plurality of non-working calendar dates wherein, each employee entry represents an employee working for an employer and wherein, each non-working date represents a non-working day, which comprises a day whereon an employee is exempted from working, each employee entry associated with at least one employee paid-leave-deposit-rate, a number of used paid leaves, and a number of carried-over paid leaves wherein, a paid-leave-deposit-rate represents the number of paid leaves allotted to an employee per a predetermined length of time within a current calendar year, the sum of each predetermined length of time pertaining to each of the at least one paid-leave-deposit-rate being equivalent to the time span of the current calendar year, wherein, a used paid leave represents a paid leave utilized by an employee, and wherein, a carried-over paid leave represents an unused paid leave of an employee that is carried over from a previous calendar year or years;

(b) a store module for enabling an employee to purchase a vacation travel service out of a plurality of vacation travel services, a vacation travel service spanning a predetermined number of vacation days, the store module comprising:

(i) a date module for enabling the employee, in the process of purchasing the vacation travel service, to mark successive vacation dates for the utilization of the vacation travel service, the vacation dates comprising an end vacation date representing the last day of the utilization of a vacation travel service; and (ii) a payment module in communication with the employee database and comprising a paid leaves module and a compulsory module, the payment module for enabling the employee to pay for the vacation travel service upon:

determining, by the paid leaves module, that the number of vacation days, which pertain to the vacation dates and which exclude the non-working days, are lesser than or equivalent to the sum of the number of paid leaves that the employee will be have by the end vacation date as determined from the at least one paid-leave-deposit-rate corresponding to the employee and the number of carried-over paid leaves subtracted by the number of used paid leaves, and determining, by the compulsory module, the vacation dates do not include a compulsory date, the compulsory module being activated before the paid leaves module such that the computer system consumes less processing power; and (c) a conversion module for converting a currently available paid leave of the employee into equivalent vacation money being variable based upon a selected day, upon conversion, the vacation money associated with the corresponding employee entry, the vacation money to be used towards the purchase of a vacation travel service.

8. The vacation scheduling system of claim 7 wherein, the equivalent monetary value being variable based upon a selected shift.

9. The vacation scheduling system of claim 7 wherein, the equivalent monetary value being variable based upon a date.

10. The vacation scheduling system of claim 7 wherein, the equivalent monetary value being variable based upon a week.

11. The vacation scheduling system of claim 7 wherein, the equivalent monetary value being variable based upon a month.

12. The vacation scheduling system of claim 7 wherein, the equivalent monetary value being variable based upon a season.

13. An employee vacation scheduling method performed by a computer system, comprising:

(a) providing an employee database comprising a plurality of employee entries and a plurality of non-working calendar dates wherein, each employee entry represents an employee working for an employer and wherein, each non-working date represents a non-working day, which comprises a day whereon an employee is exempted from working, each employee entry associated with at least one employee paid-leave-deposit-rate and a number of used paid leaves, wherein, a paid-leave-deposit-rate represents the number of paid leaves allotted to an employee per a predetermined length of time within a current calendar year, the sum of each predetermined length of time pertaining to each of the at least one paid-leave-deposit-rate being equivalent to the time span of the current calendar year, and wherein, a used paid leave represents a paid leave utilized by an employee; and (b) providing a store module for enabling an employee to purchase a vacation travel service out of a plurality of vacation travel services, a vacation travel service spanning a predetermined number of vacation days, the store module comprising:

(i) a date module for enabling the employee, in the process of purchasing the vacation travel service, to mark successive vacation dates for the utilization of the vacation travel service, the vacation dates comprising an end vacation date representing the last day of the utilization of a vacation travel service; and (ii) a payment module in communication with the employee database and comprising a paid leaves module and a compulsory module, the payment module for enabling the employee to pay for the vacation travel service upon:

determining, by the paid leaves module, that the number of vacation days being variable based upon a selected day, which pertain to the vacation dates and which exclude the non-working days, are lesser than or equivalent to the sum of the number of paid leaves that the employee will be have by the end vacation date as determined from the at least one paid-leave-deposit-rate corresponding to the employee and a number of carried-over paid leaves that corresponds to the employee subtracted by the number of used paid leaves, and determining, by the compulsory module, the vacation dates do not include a compulsory date, the compulsory module being activated before the paid leaves module such that the computer system consumes less processing power;

wherein, the number of carried-over paid leaves are associated with each employee entry, a carried-over paid leave representing an unused paid leave of an employee that is carried over from a previous calendar year or years.

14. The employee vacation scheduling method of claim 13 wherein, the number of carried-over paid leaves being variable based upon a selected shift.

15. The employee vacation scheduling method of claim 13 wherein, the number of carried-over paid leaves being variable based upon a date.

16. The employee vacation scheduling method of claim 13 wherein, the number of carried-over paid leaves being variable based upon a week.

17. The employee vacation scheduling method of claim 13 wherein, the number of carried-over paid leaves being variable based upon a month.

18. The employee vacation scheduling method of claim 13 wherein, the number of carried-over paid leaves being variable based upon a season.

* * * * *